United States Patent Office 3,448,955
Patented June 10, 1969

3,448,955
SPLICE JOINT FOR CABLE TRAYS
Keith Thomas Fussell, Roseville Chase, New South Wales, Australia, assignor to Guest, Keen & Nettlefolds (Aust.) Pty. Limited, Alexandria, New South Wales, Australia
Filed Dec. 9, 1966, Ser. No. 600,415
Claims priority, application Australia, Dec. 16, 1965, 67,989/65
Int. Cl. F16l 3/00
U.S. Cl. 248—58                                 5 Claims

ABSTRACT OF THE DISCLOSURE

A ladder-like cable tray comprising two side-plates and a floor of rungs fixed to the side-plates and splice-joints in the side plates each comprising an external fish-plate bolted on the outside of the plates, above the level of the floor rungs, by bolts which do not intrude into the cable space of the tray; the plate metal about the bolt holes is relieved of bearing stress and the bolts are relieved of shear stress by provision of one or more interfitting keys and keyways which extend longitudinally and as part of the lapping surfaces of the splice.

---

Figure 1:
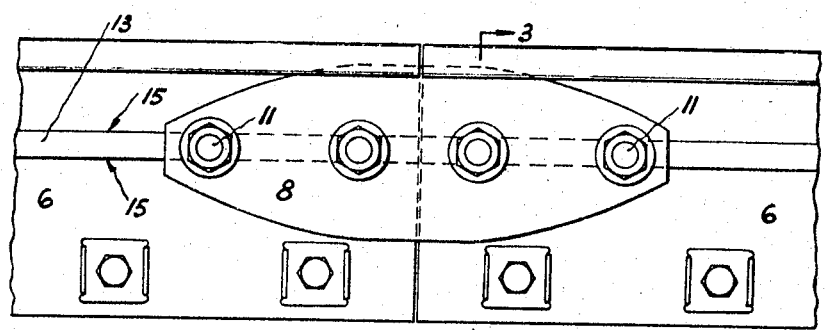

This invention relates to trays as used in factories, workshops and elsewhere for the support of electrical cables, air hoses and the like. Such "cable" trays are made in sections of convenient length; each of these sections consists of two side-plates and a plurality of rungs having their ends respectively secured to the side-plates. The sections are joined together in end-to-end alignment, to make up a required length of tray, by fish-plates and bolts applied to the mutually adjacent ends of neighbouring side-plates.

More particularly stated, the present invention relates to fish-plate splices of the kind just referred to.

Experience has shown that these splices tend to sag, particularly where a splice occurs about midway between two of the wall brackets or other supports upon which the tray is mounted. This sag manifests itself as a settling of the splice joint under load, and is due to such causes as bearing failure of the metal about the bolt-holes in the side-plates or the fish-plate, take-up of the clearance amount by which the bolt-holes may be greater than the bolts, and so on. Bearing failure is likely to arise in the side-plates where they are of relatively thin metal (as is desirable for weight and metal saving) particularly where they are of aluminum or other soft metal. Clearance take-up settling could be largely overcome by making the bolts tight-fitting in the bolt holes, but that is objectionable because it makes it harder to insert the bolts and it would require the side-plates to be very accurately cut to required length; in this last respect it has been common in such fish-plate splices to make the bolt-holes a good deal oversize so that accuracy of side-plate length is less critical. It might be thought that this last difficulty could be overcome by using elongated bolt-holes, as distinct from round oversized holes, but that is not a success because it reduces the bearing area between bolt and bolt-hole, so increasing likelihood of bearing stress failure of the joint.

In fish-plate splices as used heretofore, splice joint settling, irrespective of whether it is accompanied by metal bearing failure in the vicinity of the bolt-holes, is in the nature of a sheer strain between the side-plate and the fish-plate, and such shear strain is resisted entirely by the bolts and the relatively thin metal in the vicinity of the bolt-holes. Thus, the object of this invention is to distribute the shear stresses in the splice joint throughout the length of that joint, as distinct from the confined bolt and bolt-hole vicinity, so ensuring against any stress intensity in any part of the joint which otherwise could give rise to joint sag. This is achieved by the provision of keying means extending the full length of the joint which provide: (a) accurate alignment of the side-plate ends irrespective of the shape, size or degree of oversize of the bolt-holes; (b) bearing lands, which, in addition to being of an area more than sufficient to meet any possibility of bearing stress failure, releive the bolt-hole vicinities of any substantial bearing loading; and, (c) effective locking of the joined side-plate ends against torsional or other settling each relative to the other and to the fish-plate associated therewith.

In accordance with the invention there is provided a splice joint in a cable tray of the type composed of a plurality of sections, each consisting of two side-plates, and a plurality of rungs whereof the ends are respectively secured to the side-plates, said splice joint joining the mutually adjacent ends of two side-plates in end-to-end alignment and comprising: a fish-plate having a lap surface which over-laps a lap surface on and shared by said ends, matching bolt-holes in said fish-plate and said ends, and bolts which extend through said bolt-holes; the splice joint being characterized in that one of said lap surfaces has at least one key which projects therefrom and extends longitudinally for the full length thereof, and the other of said lap surfaces has a keyway therein into which said key tightly fits when said fish-plate is bolted to said ends.

The key is preferably formed on the side-plate ends, and the key-way in the fish-plate. It is also preferable that only one key (and key-way) be provided, in order to keep production and tooling as simple as possible. According to a further preference, the cross-sectional shape of the key (and the key-way) in that of a stub buttress tooth, thus providing two tapering bearing lands able to wedge or jam tightly between the sides of the complementarily shaped key-way as the bolts reach, or almost reach, the point of being fully tightened.

If the keyway is formed simply as a groove in one of the lap surface elements (the fish-plate, for example) that element will be weakened merely by the presence of the key-way; therefore, it is desirable (in such case) for the key-way (and hence the key) to be disposed at or near the neutral axis of the joint. For the same reasons, but irrespective of how the key-way is formed, it is desirable for the bolt-holes also to be in the same vicinity; hence, in the preferred embodiment of the invention the bolt-holes are in a single straight row, and the centre line of this row coincides with that of the key and key-way.

Figure 2:
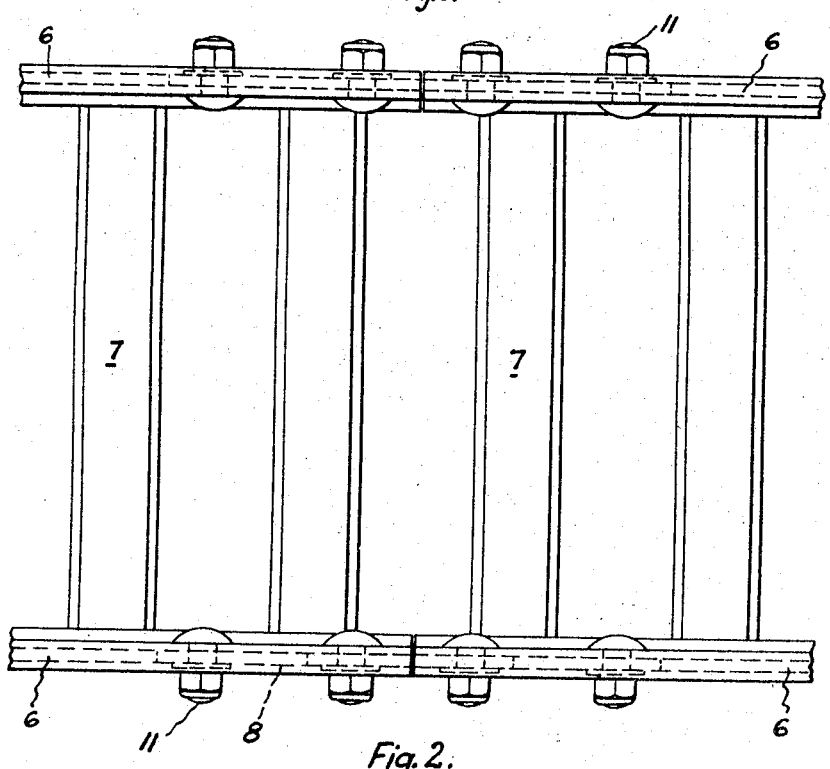
Figure 3:
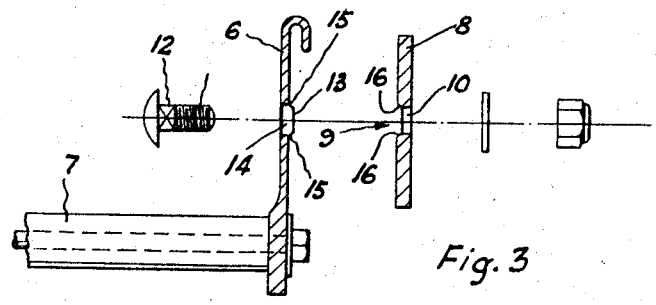
Figure 4:
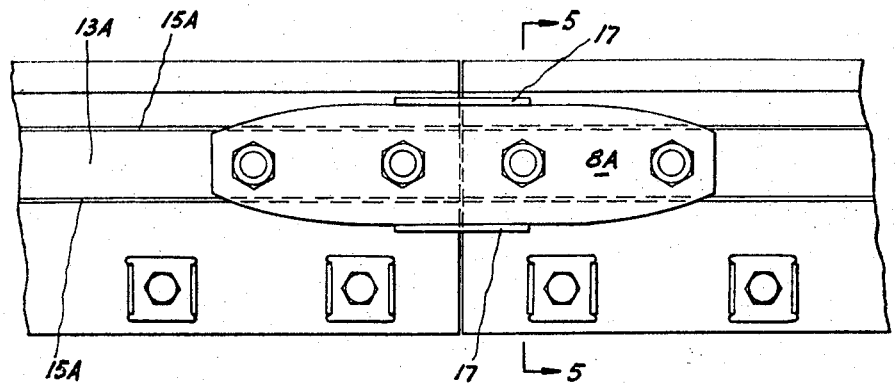
Figure 5:
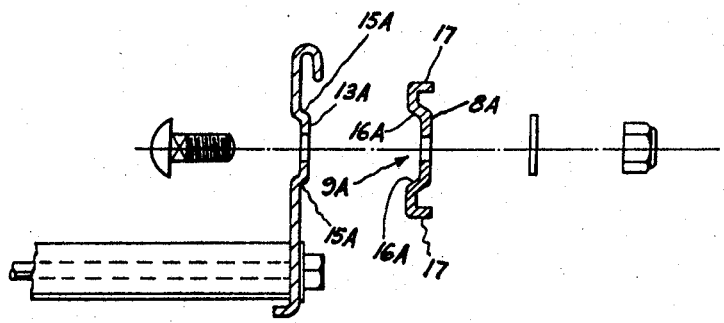

Two embodiments of the invention are illustrated in the drawings herewith:

FIG. 1 is a side elevation of portion of a cable tray showing a splice joint between two sections;
FIG. 2 is a plan view of the tray of FIG. 1;
FIG. 3 is a sectional end elevation taken on line 3—3 in FIG. 1, but with the splice joint parts separated.
FIG. 4 is a view similar to FIG. 1 showing a modified embodiment; and
FIG. 5 is a view similar to FIG. 3, taken relative to line 5—5 in FIG. 4.

Referring to FIGS. 1 to 3, the cable tray is composed of side-plates 6 and a plurality of rungs 7, which constitute the floor of the tray and are fixed at their ends to the side plates.

In the illustrated splice joint, the fish-plate 8 is (approximately) of oval shape with a key-way 9 formed in its lap surface on its longitudinal center line. Four bolt-holes 10 are provided in a single row having the same center line. The bolt-holes are preferably rectangular to accommodate bolts 11 having squared shank portions 12 adjacent the bolt heads. The height of the bolt-holes is great enough to provide ordinary mechanical clearance for insertion of the bolts; the length of the bolt-holes (in the direction of the mentioned center line) is preferably greater than that just necessary for mechanical clearance by such amount as may be required for longitudinal adjustment of one side-plate relative to the other participating in the splice joint.

The end portions of the participating side-plates have a key 13 projecting from the lap surface which they share. The bolt-holes 14 in the side-plates are preferably the same as those just described for the fish-plate.

It will be seen from FIG. 3, that the cross-sectional shape of the key 13 is that of a stub buttress tooth; and the cross-sectional shape of the key-way 9 is the envelope of that shape. This provides tapered lands 15 and 16 which are able to mate together tightly when the joint is assembled by tightening of the bolts.

The arrangement shown in FIGS. 4 and 5 is virtually the same as that described with reference to FIGS. 1 to 3 except that the key 13A and the key-way 9A are wider, and the fish plate 8A is furnished with strengthening flanges 17. The tapered lands 15A and 16A fit together in the same way as described above with reference to lands 15 and 16.

In FIGS. 1 to 3 the side-plates are preferably made as metal extrusions. In FIGS. 4 and 5 the side plates are preferably made by sheet metal rolling or pressing.

What is claimed is:

1. In a cable tray of the type composed of a plurality of sections each consisting of two side-plates having inner faces which define therebetween an unobstructed cable space, and a plurality of rungs having ends respectively secured to the side-plates thereby to constitute a floor for said cable space; an improvement comprising a splice joint for joining mutually adjacent ends of two side-plates in end-to-end alignment, including at either side of the tray, a single fish-plate having a lap surface which overlaps a lap surface which is on the outer faces of and is shared by said ends and is disposed wholly above the level of said floor, said single fish-plate and said ends having aligned holes, bolts with shanks which extend through said holes without intrusion into said cable space, at least one key on one of said lap surfaces which projects laterally therefrom and extends longitudinally for the full length thereof, and a keyway on the other of said lap surfaces into which said key tightly fits when said fish-plate is bolted to said ends.

2. A splice joint according to claim 1 wherein said key and said key-way include tapered lands which are fit tightly together.

3. A splice joint according to claim 1 wherein said key is formed on the side-plates and said key-way is formed in the fish-plate.

4. A splice joint according to claim 1 wherein said holes are in a single row having a center-line coincident with that of said key and key-way.

5. A splice joint according to claim 4 wherein said center line is substantially coincident with the neutral axis of said side plates.

References Cited

UNITED STATES PATENTS

| 2,708,828 | 5/1955 | Pruyn | 287—104 X |
| 2,905,416 | 9/1959 | Wiegand | 287—108 X |
| 3,348,865 | 10/1967 | Dalton | 287—189.36 |

FOREIGN PATENTS

| 821,029 | 4/1937 | France. |
| 1,059,018 | 6/1959 | Germany. |

CARL W. TOMLIN, *Primary Examiner.*

DAVE W. AROLA, *Assistant Examiner.*

U.S. Cl. X.R.

287—64